US007716723B1

(12) United States Patent
Taylor et al.

(10) Patent No.: US 7,716,723 B1
(45) Date of Patent: May 11, 2010

(54) SYSTEM AND METHOD FOR NETWORK USER AUTHENTICATION

(75) Inventors: Wayne N. Taylor, Durham, NC (US); Joseph A. Salowey, Seattle, WA (US); Michael A. Wright, Cary, NC (US); Amitava Das, Chapel Hill, NC (US); William C. Gossman, Seattle, WA (US); Gopal K. Dommety, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1077 days.

(21) Appl. No.: 10/266,819

(22) Filed: Oct. 7, 2002

(51) Int. Cl.
*G06F 15/16* (2006.01)
*G06F 7/04* (2006.01)
*H04L 29/06* (2006.01)
*H04K 1/00* (2006.01)

(52) U.S. Cl. .......................... 726/7; 380/273; 713/153
(58) Field of Classification Search ................ 713/153; 726/7; 380/273
See application file for complete search history.

(56) References Cited

U.S. PATENT DOCUMENTS

| | | | | |
|---|---|---|---|---|
| 5,850,445 | A * | 12/1998 | Chan et al. ................ | 380/247 |
| 5,991,407 | A * | 11/1999 | Murto ....................... | 380/248 |
| 6,073,017 | A * | 6/2000 | Xu et al. ................... | 455/435.1 |
| 6,101,380 | A * | 8/2000 | Sollee ....................... | 455/411 |
| 6,128,389 | A * | 10/2000 | Chan et al. ................ | 380/247 |
| 6,539,237 | B1 * | 3/2003 | Sayers et al. .............. | 455/555 |
| 6,608,832 | B2 * | 8/2003 | Forslow .................... | 370/353 |
| 6,690,930 | B1 * | 2/2004 | Dupre ....................... | 455/411 |
| 6,735,441 | B1 * | 5/2004 | Turgeon et al. ........... | 455/433 |
| 6,741,852 | B1 * | 5/2004 | Mohrs ....................... | 455/411 |
| 6,922,559 | B2 * | 7/2005 | Mohammed .............. | 455/421 |
| 6,937,566 | B1 * | 8/2005 | Forslow .................... | 370/231 |
| 6,993,389 | B2 * | 1/2006 | Ding et al. ................ | 607/25 |
| 7,188,360 | B2 * | 3/2007 | Gerdes et al. ............. | 726/4 |
| 7,213,144 | B2 * | 5/2007 | Faccin et al. ............. | 713/153 |
| 7,310,307 | B1 * | 12/2007 | Das et al. .................. | 370/229 |
| 7,421,083 | B2 * | 9/2008 | Medvinsky ............... | 380/279 |
| 2002/0009199 | A1 * | 1/2002 | Ala-Laurila et al. ..... | 380/247 |
| 2002/0044552 | A1 * | 4/2002 | Vialen et al. ............. | 370/389 |
| 2002/0049902 | A1 * | 4/2002 | Rhodes .................... | 713/153 |

(Continued)

FOREIGN PATENT DOCUMENTS

WO WO 02/054811 A1 * 7/2002

OTHER PUBLICATIONS

Chii Hwa Lee, Min Shiang Hwang, Wei Pang Yang "Enhanced Privacy and Authentication for the Global System for Mobile Communications" Wireless Networks, vol. 5, Issue 4, Jul. 1999, pp. 231-243.*

(Continued)

*Primary Examiner*—Matthew T Henning
(74) *Attorney, Agent, or Firm*—Baker Botts L.L.P.

(57) ABSTRACT

A system for user authentication includes a gateway operable to receive a user authentication request in an Internet Protocol format from a server. The gateway communicates the user authentication request in a Signaling System 7 protocol to a user registry. The gateway is also operable to receive a user authentication response in the Signaling System 7 protocol from the user registry. The gateway communicates the user authentication response in the Internet Protocol format to the server.

9 Claims, 3 Drawing Sheets

U.S. PATENT DOCUMENTS

| | | | |
|---|---|---|---|
| 2003/0041122 A1* | 2/2003 | Segal | 709/219 |
| 2003/0119480 A1* | 6/2003 | Mohammed | 455/411 |
| 2003/0171112 A1* | 9/2003 | Lupper et al. | 455/414.1 |
| 2005/0177733 A1* | 8/2005 | Stadelmann et al. | 713/185 |

OTHER PUBLICATIONS

Paulo S. Pagliusi, A Contemporary Foreword on GSM Security, Lecture Notes in Computer Science, vol. 2437, Jan. 2002, pp. 129-144.*

Rigney et al. Remote Authentication Dial in User Service (RADIUS), RFC 2138, 1997, Network Working Group, pp. 1-65.*

Schneier, Bruce, "Applied Cryptography: Second Edition", 1996, John Wiley and Sons, pp. 183-184.*

Juha Ala-Laurila, et al. "Wireless LAN Access Network Architecture for Mobile Operators", IEEE Communications Magazine, Nov. 2001, pp. 82-89, Nov. 2001.

* cited by examiner

SYSTEM AND METHOD FOR NETWORK USER AUTHENTICATION

TECHNICAL FIELD OF THE INVENTION

This invention relates in general to data networks, and more particularly to a system and method for network user authentication.

BACKGROUND OF THE INVENTION

Mobile device networks such as wireless telephone networks are presently limited in the amount of data that is accessible by a mobile device user in a timely fashion. Wireless local area networks (WLANs) are increasingly being deployed in such public places as coffee shops, airports, hotels, and conference centers as a way to provide larger amounts of data to a mobile device user. WLAN access offers an opportunity for service providers to gain revenues from data services and for users to enjoy wireless high-speed data access in public spaces. Mobile network operators are interested in this opportunity because they already possess an established subscriber base with whom they presently have a billing relationship.

Because a public WLAN is not always operated by a mobile device user's own network, a protocol is required to authenticate a user across data networks. Authentication of a mobile device user is typically performed using Signaling System 7 (SS7) formatted communications between the mobile device network and the mobile device. However, communications between various networks takes place using the Internet Protocol (IP). SS7-format communications are not interchangeable with IP-format communications, making it difficult to implement a SS7-based authentication process using IP-format communications.

SUMMARY OF THE INVENTION

From the foregoing, it may be appreciated by those skilled in the art that a need has arisen for an interface that can connect an Internet Protocol network with a Signaling System 7 (SS-7) network. In accordance with the present invention, a system and method for network user authentication is provided that substantially eliminates or greatly reduces disadvantages and problems associated with conventional SS7-format authentication implementations.

In accordance with one embodiment of the present invention, a system for user authentication includes a gateway operable to receive a user authentication request in an Internet Protocol format from a server. The gateway communicates the user authentication request in a Signaling System 7 protocol to a user registry. The gateway is also operable to receive a user authentication response in the Signaling System 7 protocol from the user registry. The gateway communicates the user authentication response in the Internet Protocol format to the server.

The present invention provides various technical advantages over conventional SS-7 format authentication implementations. For example, on technical advantage is a system for authenticating a network user implementing both Internet Protocol and SS-7 network connections. Another technical advantage is the use of Remote Authentication Dial-In User Service and Mobile Application Part formats. Yet another technical advantage is the retrieval and storage of authentication triplets for use in authenticating a network user. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
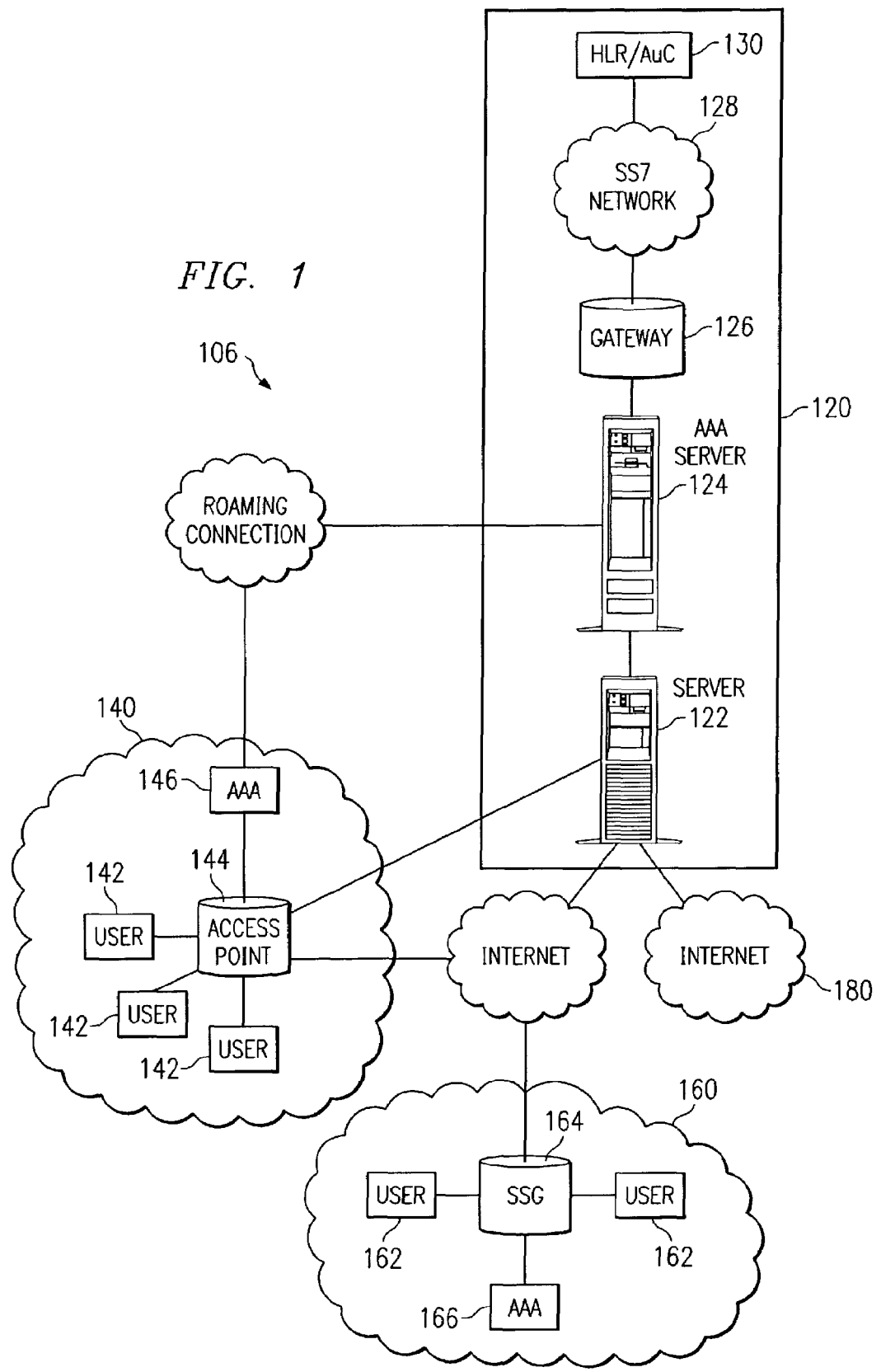
FIG. 1 illustrates a data network environment.

FIG. 1, illustrates a data network environment in which network users send and receive information. FIG. 1 shows a data network 100 that includes a centralized authentication center 120 in communication with a number of remote user locations, such as locations 140 and 160. It is envisioned that centralized authentication center 120 could be co-located with a remote user location in other within the scope of the present invention. Data network 100 may include both wired and wireless network connections.

Centralized authentication center 120 includes a server 122, an Authentication, Authorization, and Accounting (AAA) server 124, a gateway 126, and a Home Location Registry (HLR) 130. HLR 130 may also be referred to as an Authentication Center (AuC) 130.

Remote User location 140 includes a number of network users 142, an access point 144, and an AAA server 146. AAA server 146 may also be referred to as a Visitor Location Registry (VLR) 146. Location 140 is an area where network users are present. For example location 140 may be a coffee shop, a hotel, an airport, or a conference center. In one embodiment of the present invention, location 140 provides a public Wireless Local Area Network (WLAN), which provides network users 142 with wireless, high-speed data access to data network 100. Location 160 is similar to location 140 and includes a number of network users 162, a server 164, and an AAA server 166.

In operation network user 142, located at location 140, wants to access information across data network 100. As one example, network user 142 wants to send and receive information across the internet 180. Before network user 142 is permitted to access data network 100, however, network user 142 must be authenticated as a valid network user. The authentication information is stored in HLR 130 of a service provider with which network user 142 has established a service relationship. There are numerous service providers available to network users 142, each with independent HLRs 130. Only HLR 130 of the service provider with which network user 142 has a relationship contains authentication information for each network user 142 that is authorized to access data network 100. Network user 142 must be authorized by its service provider before network user 142 will be permitted to access any information on data network 100.

When network user 142 seeks access to data network 100, it communicates an access request to access point 144. Access point 144 may also be referred to as a service selection gateway 144. Access point 144 forwards the access request to AAA server 146. In the illustrated embodiment, user authentication information for network user 142 is located in HLR 130, which is not directly accessible by AAA server 146. With respect to network user 142, AAA server 146 functions as VLR 146. To authenticate network user 142, VLR 146 must communicate with AAA server 124, which retrieves authentication information for network user 142 from HLR 130. AAA server 124 communicates the access request from network user 142 to gateway 126. Gateway 126 communicates the access request across Signaling System 7 network 128 to HLR 130. When HLR 130 receives the access request from network device 142, it determines whether or not network user 142 should be permitted to access data network 100. Granting network user access to data network 100 may be based a multitude of factors, including determining whether network user 142 is registered and authorized to use data network 100 or whether network user 142 has a fully paid account balance.

If HLR 130 determines that network user 142 should be permitted to access data network 100, HLR 130 will send an authenticating response to gateway 126 across SS7 network 128. Gateway 126 will communicate the message to AAA server 124, which will communicate the authenticating response to VLR 146. VLR 146 will communicate the authenticating response to access point 144. User 142 will now be permitted to send and receive information across data network 100.

Figure 2:
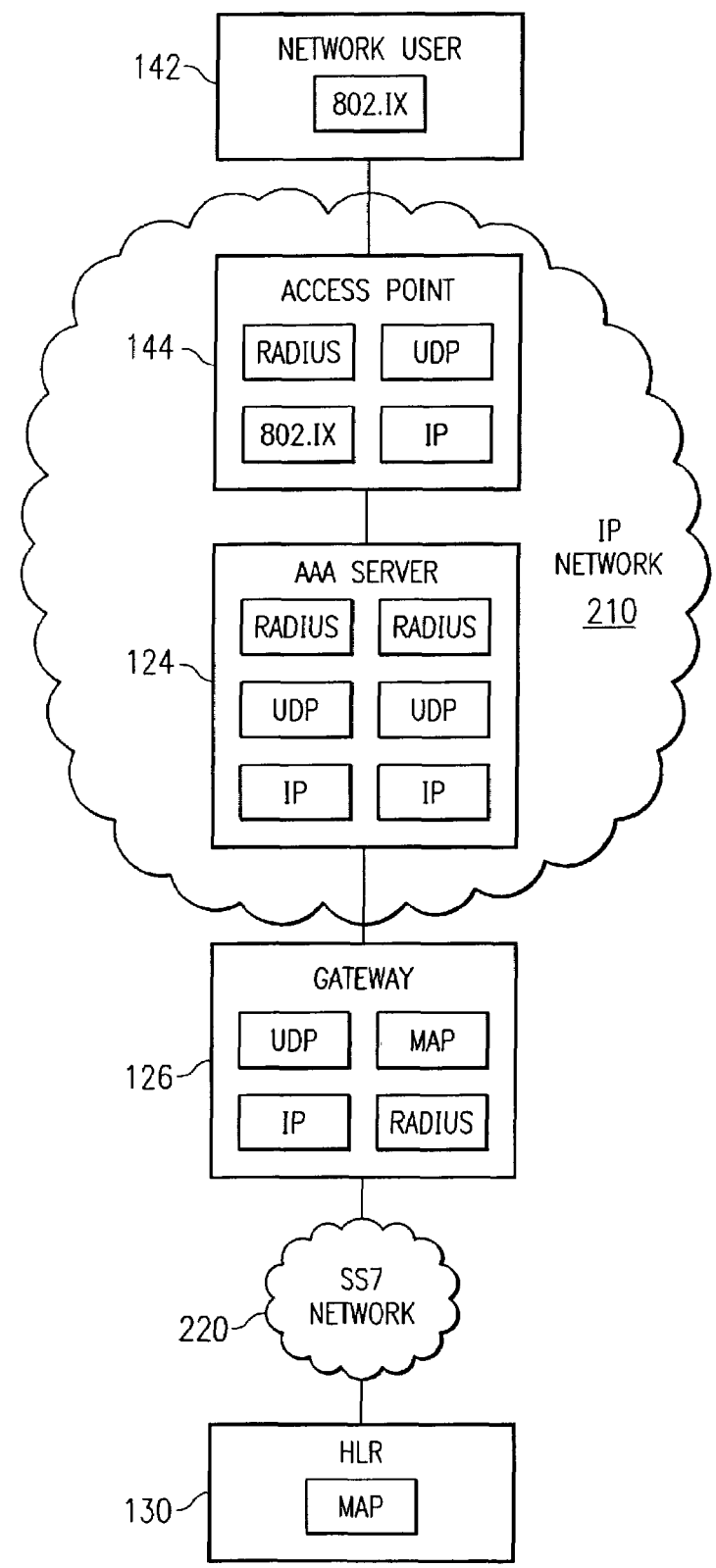
FIG. 2 illustrates a block diagram of communications formats within the data network environment.

FIG. 2 illustrates a block diagram of the communications that occur during the authentication of data network access for network user 142.

In one embodiment of the present invention, network user 142 communicates with access point 144 using the 802.1x communications format. Access point 144 communicates with AAA server 124 across an Internet Protocol (IP) network. In the illustrated embodiment, the IP network also applies the User Datagram Protocol (UDP) to run on top of the IP network. Access Point 144 interfaces with AAA server 124 using the Remote Authentication Dial-In User Service (RADIUS) format. In one embodiment RADIUS is implemented with Extensible Authentication Protocol (EAP) extensions.

AAA server 124 communicates with gateway 126 across IP network 210. This communication is accomplished using UDP over IP and RADIUS along with proprietary Vendor Specific Attributes (VSAs). Gateway 126 is operable to receive the RADIUS information in IP format from AAA server 124.

Gateway 126 converts the information received in RADIUS format into the Mobile Application Part (MAP) format. MAP format is a part of the Signalling System 7 (SS7) protocol used in wireless mobile telephony. Gateway 126 communicates with HLR 130 using the MAP format across Signaling System 7 (SS7) network 220. When gateway 126 receives MAP-format information back from HLR 130, it converts the information into RADIUS format and communicates it with AAA server 124 across IP network 210.

The general topic of Global System for Mobile Communications (GSM) authentication and encryption will now be explored in greater detail. When a network user is registered with the GSM network, the user is assigned an International Mobile Subscriber Identity (IMSI) and key $K_i$. The IMSI and $K_i$ are stored in a Subscriber Identity Module (SIM). The $K_i$ for network user 142 is also stored in a Home Location Registry (HLR) indexed by IMSI.

GSM authentication is based on a challenge-response mechanism. The authentication algorithm that runs on the SIM can be given a 128-bit random number (RAND) as a challenge. The SIM runs an operator-specific confidential algorithm, which takes the RAND and a secret key $K_i$ stored on the SIM as inputs and produces a 32-bit response (SRES) and a 64-bit key $K_c$ as output.

The network user communicates the IMSI to a Visitor Location Registrar (VLR) 146 when the network user desires to gain data network access. VLR 146 queries HLR 130 for authentication credentials for the network user using MAP over SS7 network 128. The query is routed by the SS7 network based on IMSI and SubSystem Number (SSN) to the HLR.

HLR 130 responds to the authentication query by sending a pre-configured number of authentication triplets to the VLR 146. The triplets are based on which is retrieved using the IMSI. The triplets consist of a random challenge (RAND), an authenticator (SRES) calculated using $K_i$, RAND, and the A3 verification algorithm, and a session key $K_c$ that is calculated using $K_i$, RAND and the A8 verification algorithm.

VLR 146 receives the RAND triplet from HLR 130 and sends it to network user 142. Network user 142 computes the SRES using its SIM and sends it back to VLR 146. VLR 146 compares the SRESs obtained from HLR 130 and network user 142. A match between the two SRESs means that network user 142 has been authenticated. Finally, an algorithm is negotiated and used for encryption of the air link using the key $K_c$.

Figure 3:
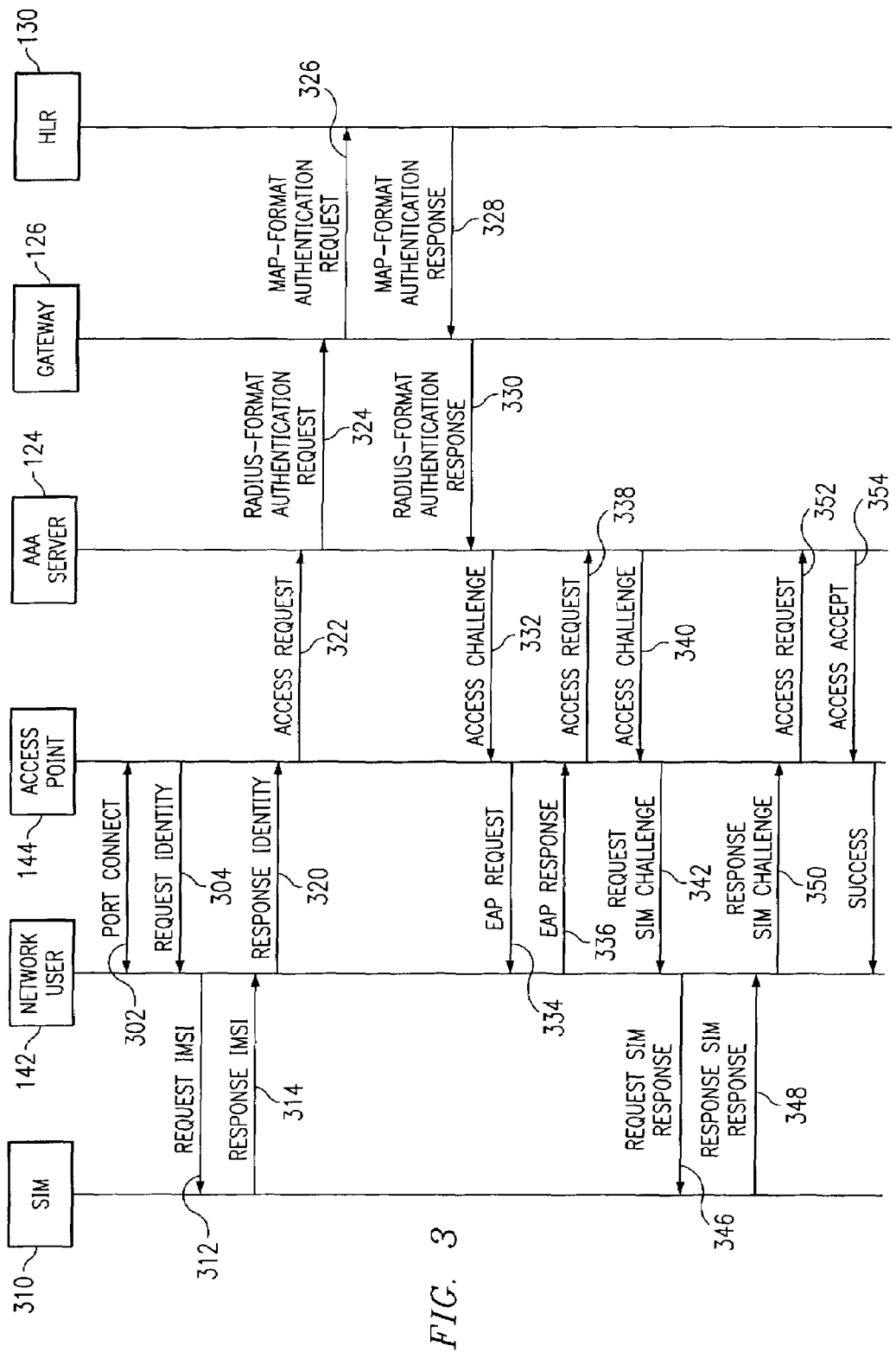
FIG. 3 illustrates a flow diagram of a network user authentication process.

FIG. 3 illustrates a flow diagram for communications between network user 142 and HLR 130 in one embodiment of the present invention. A communication is initiated when network user 142 communicates a request to access data network 100 to access point 144, resulting in a Port Connect 302.

Access point 144 responds to Port Connect 302 by sending an Extensible Authentication Protocol (EAP)-format Request Identity command 304 to network user 142. The function of command 304 is to request the identity of network user 142. The identity of network user 142 is recorded as an International Mobile Subscriber Identity (IMSI) in a Subscriber Identity Module (SIM) 310. In one embodiment of the present invention, SIM 310 is located in a device external to network user 142 that is in communication with network user 142. In another embodiment SIM 310 is located within network user 142. SIM 310 may also be referred to as a smart card 310. SIM 310 makes it possible to identify network user 142 to HLR 130 as a legitimate user. Network user 142 issues a Request IMSI command 312 to SIM 310 to obtain the IMSI of network user 142. SIM 310 responds to Request IMSI command 312 by returning the IMSI of network user 142 in Response IMSI 314.

Upon receiving the IMSI from SIM 310, network user 142 sends an EAP-format Response Identity communication 320 to access point 144. Response Identity communication 320 sends the IMSI of network user 142 and realm information to AAA server 124 via access point 144. The identity of network user 142 is formatted as IMSI@realm. The realm component is configured by network user 142 to indicate to AAA server 124 that EAP-SIM is in use.

When access point 144 receives Response Identity communication 320 from network user 142, it generates an Access Request message 322 to be sent to AAA server 124. For the flow diagram of FIG. 3, only AAA server 124 is shown. For the embodiment illustrated in FIG. 1, however, a message from network user 142 is actually sent by access point 144 to AAA server 146. AAA server 146 receives the message and forwards it to AAA server 124. For purposes of simplicity, this two-step process is illustrated as one communication from network user 142 to AAA server 146. The function of Access Request message 322 is to forward the Response Identity message 320 in RADIUS format to AAA server 124. Access point 144 copies the identity in Response Identity message 320 into a username attribute and forwards the information contained in Response Identity message 320 to AAA server 124. In addition to the username information from Response Identity message 320, Access Request 322 may also include other RADIUS attributes, such as a message authenticator, NetWare Access Server-Identification (NAS-ID), service request, or calling station ID. The RADIUS attribute calling station ID may also be referred to as a MAC Address, which is the address for a device as it is identified at the Media Access Control (MAC) protocol layer.

Upon receiving Access Request message 322, AAA server 124 determines if it can process the message and which EAP authentication messages to use. AAA server 124 may make that decision based on one or more attributes such as username, NAS-ID, service type, and EAP Message. AAA server 124 generates a RADIUS-format authentication request 324. The function of authentication request 324 is to obtain authentication triplets from gateway 126. In addition to the IMSI information, authentication request 324 requests a number of triplets. The possible triplets include RAND, SRES, and $K_c$.

Upon receiving the RADIUS-format authentication request 324, gateway 126 generates a MAP-format authentication request 326. The function of this message is to retrieve authentication triplets from HLR 130 using the MAP protocol. HLR 130 returns the authentication triplets in a MAP-format authentication response 328. Upon receiving authentication response 328, gateway 126 is operable to generate a RADIUS-format authentication response 330. The function of this message is to return the authentication triplets to AAA server 124. Authentication response 330 may include different types of authentication triplets, including RAND, SRES, and $K_c$. If gateway 126 receives more than the requested number of authentication triplets, gateway 126 should return them all to AAA server 124. If gateway 126 receives less than the requested number of authentication triplets, it returns the received authentication triplets to AAA server 124. AAA server 124 will then need to make another request for authentication triplets.

AAA server 124 obtains authentication triplets from HLR 130 by using gateway 126. HLR 130 may take multiple message cycles to respond to a query from gateway 126. AAA server 124 must be able to function properly despite this latency. HLR 130 may return more authentication triplets than AAA server 124 will use for one authentication process. In one embodiment of the present invention, AAA server 124 stores authentication triplets in a memory cache to reduce the load on HLR 130. AAA server 124 is configurable to cache unused triplets. In another configuration, unused authentication triplets are cached by gateway 126.

In one embodiment of the present invention, gateway 126 includes a memory cache for storing authentication triplets. In this embodiment, the ability to cache authentication triplets on gateway 126 reduces the load on HLR 130 and may speed authentication of network user 142. EAP-SIM authentication requires authentication triplets to be used in pairs. As soon as a pair is used it should be removed from the cache, because a pair of authentication triplets should not be reused.

In another embodiment of the present invention, it is possible to cache authentication triplets at either AAA server 124 or gateway 126. Gateway 126 will return more than the requested number of authentication triplets to AAA server 124 if caching is not enabled on gateway 126. Gateway 126 may return less than the requested number of triplets to AAA server 124 if gateway 126 has less than the requested number cached, or if gateway 126 receives less than the requested number of authentication triplets from HLR 130. Gateway 124 may return zero authentication triplets to indicate that the IMSI of a network user 142 is valid, but for some reason authentication triplets could not be obtained.

AAA server 124 must be prepared to receive many authentication triplets or as few as zero authentication triplets from a request. AAA server 124 may be required to make additional requests for more authentication triplets. If AAA server 124 does not cache authentication triplets, it should request only the number of authentication triplets it needs. If AAA server 124 does not cache and it receives more triplets than it can use, it drops the unused triplets.

In one embodiment of the present invention, authentication triplets may be reused. AAA server 124 controls if authentication triplet reuse is permitted. If an authentication triplet is reused, it should only be reused a limited number of times. AAA server 124 requests fresh authentication triplets from gateway 126 if AAA server 124 has a reuse limit of zero, meaning no authentication triplet reuse is permitted. If AAA server 124 has an reuse limit that is non-zero, however, cached authentication triplets may be requested. When configured to permit authentication triplet reuse, AAA server 124 and gateway 126 allow reuse when gateway 126 indicates a problem with HLR 130 but no problem with network user 142. Authentication triplet reuse may also be advantageous when no gateway 126 is reachable for a specified period of time.

Upon receiving authentication response 330 AAA server 124 issues an access challenge 332 to access point 144. The main function of access challenge 332 is to start the EAP-SIM authentication process by sending an EAP request to network user 142 via access point 144. Upon receiving access challenge 332, access point 144 issues EAP request 334 to network user 142.

Upon receiving EAP request 334 from access point 144, network user 142 will respond with EAP response 336. The main function of EAP response 336 is to transmit a random nonce from network user 142 to AAA server 124 by access point 144. In one embodiment of the present invention, the nonce is a random 16 bit nonce.

Upon receiving EAP response 336 from network user 142, access point 144 issues access request 338 to AAA server 124. The function of this message is to forward the EAP-SIM response to AAA server 124. Access request 338 includes EAP response 336 from network user 142 and may include other RADIUS attributes such as a message authenticator, NAS-ID, service request, and calling station ID.

AAA server 124 responds to access request 338 by issuing access challenge 340. The function of access challenge 340 is to send an authentication challenge to network user 142 via access point 144. Access challenge 340 is formatted as an EAP message that contains EAP request 334, two RANDs from the authentication triplets obtained from HLR 130, a MAC-RAND created by using the two RANDs and two $K_c$s from the authentication triplets, the IMSI, client identity, and message type.

Upon receiving access challenge 340, access point 144 issues request SIM challenge 342 to network user 142. The function of request SIM challenge 342 is to forward the EAP request from AAA server 124 to network user 142. Access point 144 does not interpret the EAP request portion of access challenge 340.

Network user 142 receives request SIM challenge 342 and issues request SIM response 346. The function of this message is to request $K_c$ and SRES from SIM 310. SIM 310 returns $K_c$ and SRES for the RANDs calculated from information on SIM 310. Network user 142 uses $K_c$ in calculations to verify MAC-RAND.

Network user 142 receives response SIM 348 and issues a response SIM challenge 350 to access point 144. The function of this message is to return MAC-SRES, which is used to authenticate network user 142. MAC-SRES is calculated from SRESs and $K_c$s from SIM 310, network user identify, IMSI, and message ID.

Access point 144 receives response SIM challenge 350 and issues an access request 352 to AAA server 124. The function of this message is to forward the EAP SIM response to AAA server 124. Access request 352 is formatted as an EAP message containing an EAP response from network user 142. Access request 352 may include other RADIUS attributes such as message authenticator, NAS-ID, service request, and calling station ID. AAA server 124 responds to access request 352 with an access accept message 354. The function of this message is to send a success message to access point 144 and network user 142 if the MAC-SRES sent in the SIM challenge matches the one calculated by AAA server 124. Access accept 354 also sends key information to access point 144 and information to any intermediate AAA proxies. Access accept 354 is formatted as an EAP success message and contains an encrypted VSA containing a session key, a session timeout attribute, and attributes used by any intermediate AAA servers. Access accept message 354 instructs access point 144 to allow network user 142 to access data network 100. Access point 144 installs keys for use in encryption. Success message 356 is issued by access point 144 to network user 142 to notify the network user 142 that authentication succeeded. Network user 142 will now be permitted to access data network 100.

Thus, it is apparent that there has been provided, in accordance with the present invention, a system and method for network user authentication that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A system for user authentication, comprising:
   a gateway operable to receive a user authentication request associated with a network user in a Remote Authentication Dial-In User Service format of an Internet Protocol from a server, the gateway operable to generate a registry authentication request by converting the Remote Authentication Dial-In User Service format to a Mobile Application Part format of a Signaling System 7 protocol, the gateway operable to communicate the registry authentication request in the Signaling System 7 protocol to a user registry, the gateway further operable to receive a registry authentication response in the Mobile Application Part format of the Signaling System 7 protocol from the user registry, the gateway operable to generate a user authentication response by converting the Mobile Application part format to the Remote Authentication Dial-In User Service format of the Internet Protocol, the gateway operable to communicate the user authentication response in the Internet Protocol to the server, wherein the user authentication response comprises zero or more sets of authentication triplets compatible with a Global System for Mobile Communications network, wherein the gateway is operable to store any received authentication triplets in the registry authentication response in a memory cache for subsequent reuse of authentication triplets, the gateway operable to allow reuse of authentication triplets when the gateway fails to have any fresh authentication triplets and the network user is valid, wherein reuse of authentication triplets is initiated by the server in accordance with a reuse limit indicating a number of times an authentication triplet can be reused.

2. The system of claim 1, wherein the user authentication response comprises three authentication triplets.

3. The system of claim 1, wherein at least one authentication triplet is used to authenticate a user more than one time.

4. A method for authenticating a user, comprising:
   receiving a user authentication request associated with a network user in a Remote Authentication Dial-In User Service format of an Internet Protocol format from a server;
   generating a registry authentication request by converting the Remote Authentication Dial-In User Service format to a Mobile Application Part format of a Signaling System 7 protocol;
   communicating the registry authentication request in the Signaling System 7 protocol to a user registry;
   receiving a registry authentication response in the Mobile Application Part format of the Signaling System 7 protocol from the user registry;
   generating a user authentication response by converting the Mobile Application part format to the Remote Authentication Dial-In User Service format of the Internet Protocol; and
   communicating the user authentication response in the Internet Protocol format to the server, wherein the user authentication response comprises zero or more sets of authentication triplets compatible with a Global System for Mobile Communications network;
   storing any authentication triplets in the user authentication response in a memory cache for subsequent reuse of authentication triplets;
   allowing reuse of authentication triplets when there are no fresh authentication triplets and the network user is valid, wherein reuse of authentication triplets is initiated by the server in accordance with a reuse limit indicating a number of times an authentication triplet can be reused.

5. The method of claim 4, wherein the user authentication response comprises three authentication triplets.

6. The method of claim 4, further comprising using at least one authentication triplet to authenticate a user more than one time.

7. A system for user authentication, comprising:
   means for receiving a user authentication request associated with a network user in a Remote Authentication Dial-In User Service format of an Internet Protocol format from a server;
   means for generating a registry authentication request by converting the Remote Authentication Dial-In User Service format to a Mobile Application Part format of a Signaling System 7 protocol;
   means for communicating the registry authentication request in the Signaling System 7 protocol to a user registry;
   means for receiving a registry authentication response in the Mobile Application Part format of the Signaling System 7 protocol from the user registry;
   means for generating a user authentication response by converting the Mobile Application part format to the Remote Authentication Dial-In User Service format of the Internet Protocol; and
   means for communicating the user authentication response in the Internet Protocol format to the server, wherein the user authentication response comprises zero or more sets of authentication triplets compatible with a Global System for Mobile Communications network;

means for storing any authentication triplets in the user authentication response for subsequent reuse of authentication triplets;

means for allowing reuse of authentication triplets when there are no fresh authentication triplets and the network user is valid, wherein reuse of authentication triplets is initiated by the server in accordance with a reuse limit indicating a number of times an authentication triplet can be reused.

8. The system of claim 7, wherein the user authentication response comprises three authentication triplets.

9. The system of claim 7, further comprising using at least one authentication triplet to authenticate a user more than one time.

* * * * *